US007976822B2

(12) United States Patent  (10) Patent No.: US 7,976,822 B2
Ravishankar et al.  (45) Date of Patent: Jul. 12, 2011

(54) CRYSTALLINE OXIDE MATERIAL AND ITS SYNTHESIS

(75) Inventors: Raman Ravishankar, Singapore (SG); Elango Shanmugam, Singapore (SG)

(73) Assignee: Agency For Science, Technology and Research, Singapore (SG)

( * ) Notice: Subject to any disclaimer, the term of this patent is extended or adjusted under 35 U.S.C. 154(b) by 722 days.

(21) Appl. No.: 11/667,922

(22) PCT Filed: Nov. 19, 2004

(86) PCT No.: PCT/SG2004/000372
§ 371 (c)(1),
(2), (4) Date: May 20, 2008

(87) PCT Pub. No.: WO2006/054950
PCT Pub. Date: May 26, 2006

(65) Prior Publication Data
US 2008/0305036 A1    Dec. 11, 2008

(51) Int. Cl.
*C01B 39/04*  (2006.01)
*C01B 39/48*  (2006.01)
(52) U.S. Cl. ........................ 423/709; 423/718
(58) Field of Classification Search .................. 423/718, 423/709
See application file for complete search history.

(56) References Cited

U.S. PATENT DOCUMENTS

| 4,873,067 A | * | 10/1989 | Valyocsik et al. | 423/279 |
| 4,954,325 A | | 9/1990 | Rubin et al. | |
| 4,973,781 A | * | 11/1990 | Valyocsik et al. | 585/467 |
| 6,821,503 B1 | * | 11/2004 | Verduijn et al. | 423/709 |
| 7,011,810 B2 | * | 3/2006 | Dakka et al. | 423/708 |
| 7,264,789 B1 | * | 9/2007 | Verdujin et al. | 423/716 |

FOREIGN PATENT DOCUMENTS

DE  103 00 094 A1  7/2004
EP  0174121 A2 * 12/1986

OTHER PUBLICATIONS

Casci, "Zeolite molecular sieves: preparation and scale-up", Microporous and Mesoporous Materials, (May 2005).*
International Search Report for PCT International Application No. PCT/SG2004/000372 mailed Jan. 10, 2005.

* cited by examiner

*Primary Examiner* — David M Brunsman
(74) *Attorney, Agent, or Firm* — RatnerPrestia

(57) ABSTRACT

Zeolites may be natural or synthetic and are inorganic crystalline aluminosilicates, with a highly regular structure of pores and channels rendering them suitable for molecular sieving, adsorption, ion exchange, dehydration, and rehydration processes for example. They generally have a definite crystalline structure as evidenced by x-ray diffraction. The present invention relates to the area of zeolites and its method of production. More particularly but not exclusively it relates to a novel zeolite ICS-3 in its "as synthesized" and its calcined forms and the method of producing both these forms.

16 Claims, 7 Drawing Sheets

ICS-3
(a) As-synthesized layered precursor
(b) the calcined material

Figure 6 – ICS-3
(a) As-synthesized layered precursor
(b) the calcined material

CRYSTALLINE OXIDE MATERIAL AND ITS SYNTHESIS

This application is a U.S. National Phase Application of PCT International Application No. PCT/SG2004/000372, filed Nov. 19, 2004.

FIELD OF THE INVENTION

The present invention relates to a novel zeolite and its method of production. More particularly but not exclusively it relates to a novel zeolite ICS-3 in its "as synthesized" and its calcined forms and the method of producing both these forms.

BACKGROUND TO THE INVENTION

The present invention relates to the area of zeolites. Zeolites may be natural or synthetic and are inorganic crystalline aluminosilicates, with a highly regular structure of pores and channels rendering them suitable for molecular sieving, adsorption, ion exchange, dehydration, and rehydration processes for example. They generally have a definite crystalline structure as evidenced by x-ray diffraction.

Zeolites have long been known to have catalytic properties for various types of hydrocarbon conversion processes.

There are around 40 types of natural zeolites and over 200 types of synthetic zeolites. However, there are less than 10 commercial zeolites. The cavities or voids within a zeolite are specific to that zeolite and uniform in size within that material. The active catalytic sites in the zeolite voids can only operate on molecules that can fit through the openings into the zeolite structure.

The lamellar zeolites, ie., zeolites with platelet morphology or sheath-like structures, are being scrutinized recently. The reason behind this search for lamellar structures is to obtain a material composite containing both micropores and mesopores separated by a gallery of pillars. These pillars might be porous crystalline network of different species such as, silica, alumina, MgO or organic surfactants such as C16-amine or non-porous network of silica. The result is the enhancement of surface area, reduction in the diffusion path and easy access to the active sites directly from the surface.

Only very few zeolites are known so far with lamellar/platelet morphology. U.S. Pat. No. 4,954,325 Rubin et al. describes MCM-22, a novel zeolite that is obtained by the calcination of a layered precursor.

Upon pillaring with silica or C16-amine, another new material, MCM-36, was obtained (U.S. Pat. No. 5,250,277). Upon delamination of the layers, the material obtained is a novel phase that contains sheets of MCM-22 zeolites, termed as ITQ-2 (A. Corma et al., *Microporous and Mesoporous Mater.*, 2000, 38, 301).

A delaminated material, ITQ-6, was obtained from Ferrierite (P. A. Vaughan, *Acta Crystallogr.* 1966, 21, 983). A layered silicate composed of hydrogen bonded ferrierite layers, MCM-47, was reported by Burton et al. (*Chem. Mater.*, 2000, 12, 2936) The zeolite ferrierite [FER] is structurally related to zeolite ZSM-57 (J. L. Schlenker, J. B. Higgins and E. W. Valyocsik, *Zeolites*, 1990, 10, 293). Recently, another lamellar zeolite, NU-6, was used to obtain a pillared material, and subsequent delamination resulted in a new phase ITQ-18 (U.S. Pat. No. 4,397,825; U.S. Pat. No. 5,266,541).

Zeolite ZSM-57 (U.S. Pat. No. 4,873,067) is a medium pore zeolite [10-MR] with interconnected 8 MRs. It is related to ferrierite type zeolite [FER]. The structure code for ZSM-57 is MFS. Few applications of this zeolite are known. The zeolite ZSM-57 was found to have platelet morphology with pentagonal crystals.

OBJECT OF THE INVENTION

It is an object of the present invention to provide a novel zeolite which at least provides the public with a useful choice.

Other objects of the invention may become apparent from the following description which is given by way of example only.

SUMMARY OF THE INVENTION

According to a first aspect of the invention there is provided an oxide material in its as-synthesized form characterised by the X-ray diffraction pattern comprising or including the lines substantially as set out in Table 2.

Preferably the oxide material characterised by the X-ray diffraction pattern comprising or including the lines substantially as set out in Table 3; more preferably in Table 4.

Preferably the oxide material has a general formula:

$$(0.001\text{-}0.5)M_{2/n}.SiO_2.yAl_2O_3.(0.15\text{-}2.0)R.zH_2O$$ 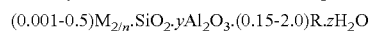

wherein M is a group I or II cation, n is the valency, y is the moles of alumina, R is the organic template, and z is the moles of water.

Preferably R is Diquat-5.

In an alternative embodiment the oxide material is in its calcined form and is characterised by the X-ray diffraction pattern comprising or including the lines substantially as set out in Table 5, preferably as set out in Table 6, most preferably Table 7.

Preferably the oxide has a general formula:

$$(0.001\text{-}0.5)M_{2/n}.SiO_2.yAl_2O_3.zH_2O$$ 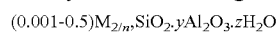

wherein M is a group I or II cation, n is the valency, y is the moles of alumina, R is the organic template, and z is the moles of water.

Preferably R is Diquat-5.

According to a further aspect of the invention there is provided a method of preparing an oxide material characterised by the X-ray diffraction pattern comprising or including the lines substantially as set out in Table 2, and having a general formula $(0.001\text{-}0.5)\ M_{2/n},\ SiO_2.yAl_2O_3.zH_2O$ wherein M is a group I or II cation, n is the valency, y is the moles of alumina, R is the organic template, and z is the moles of water, comprising or including the steps of:
  a) preparing a reaction mixture including a silica source, template source, sodium source, having mole ratios substantially in the range:
    Si/Al from 30-200;
    R/Si from 0.05-2.0
    Na/Si from 0.1-0.7
    $H_2O$/Si from 35-60.
  b) maintaining the reaction mixture under conditions allowing formation of the oxide material,
  c) recovering the oxide material from the reaction mixture.

Preferably in step a) the mole ratios are substantially in the range:
  Si/Al from 50-80
  R/Si from 0.1-1.0
  Na/Si from 0.3-0.5
  $H_2O$/Si from 40-50.

Preferably the template:silicon ratio is substantially in the range 1>R/Si>0.08. More preferably the template:silicon ratio is substantially in the range R/Si=0.1-1.0.

Preferably the method comprises the further step:
d) heating to convert the oxide material to a calcined form characterised by the X-ray diffraction pattern comprising or including the lines substantially as set out in Table 5.

Preferably the calcined form has a general formula:

$$(0.001-0.5)M_{2/n}.SiO_2.yAl_2O_3.zH_2O$$

wherein M is a group I or II cation, n is the valency, y is the moles of alumina, R is the organic template, and z is the moles of water.

According to a further aspect of the invention there is provided an oxide material prepared substantially according to the method as described above.

Other aspects of the invention may become apparent from the following description which is given by way of example only and with reference to the accompanying drawings.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention will now be described by way of example only and with reference to the drawings in which.

DETAILED DESCRIPTION OF THE INVENTION

Figure 1:
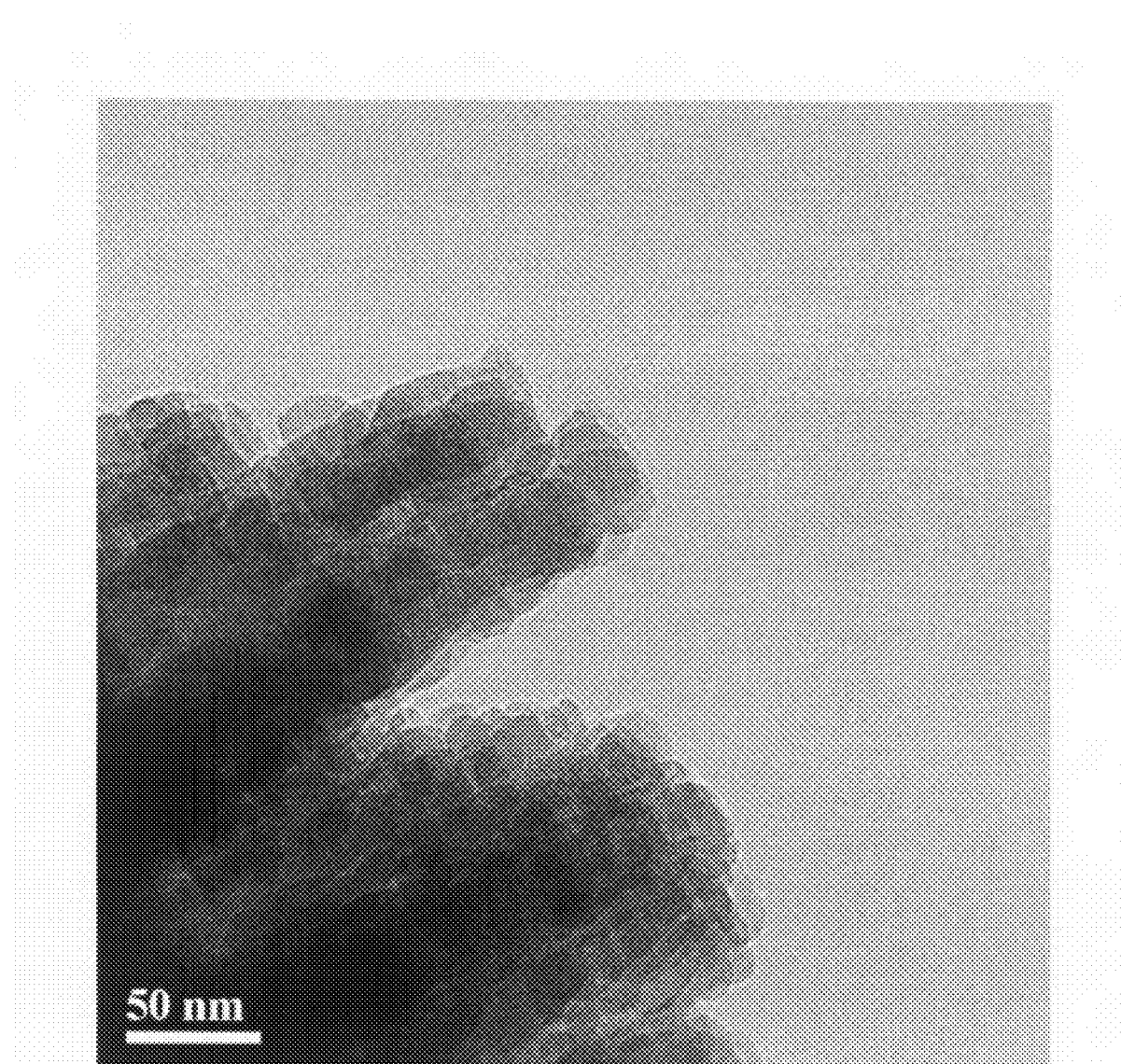
FIG. 1: is a transmission electron micrograph (TEM) of ICS-3 as synthesized.

The present invention is directed to a novel composition of a porous crystalline material, in both "as-synthesized" precursor form and its calcined form (termed ICS-3), and methods for their preparation. Whilst having some structural and synthetic similarities to zeolite ZSM-57, this is a novel material. It possesses a similar x-ray diffraction pattern to that of zeolite ZSM-57 however it also includes reproducible additional peaks indicative of the novel phase.

MFS is the structure code of ZSM-57. Zeolite ZSM-57 has interconnected 10-membered rings (MR) and 8-MR channels, i.e., intersecting 10- and 8-MR channel systems. The synthesis of ZSM-57 uses the same template, Diquat-5 as in the present invention. The raw materials required for the synthesis also have some common features. Novelty arises from variation in proportion of templates and aluminum sources and in the novel zeolite structures produced. The novel zeolite ICS-3 is believed to be a relative of ZSM-57. This could also be seen in that the x-ray patterns of both ICS-3 and ZSM-57 have a number of common lines.

The invention includes:
"as synthesized ICS-3" which is a layered pre-cursor form of the novel zeolite ICS-3. The "as-synthesized" form includes pores still filled with templates and the active sites are generally inaccessible due to its layered structure.

"calcined ICS-3" or ICS-3 proper. This is the form of the zeolite once the as synthesized form has been heat treated. The structure is no longer layered in the same way; the layering has been destroyed (the layered structure collapses upon heating). Such a zeolite is particularly of interest as each sheet contains active sites and pores thus the reactivity is very high due to the high accessibility of these sites.

Structure and Characteristics of ICS-3

The invention relates to the as-synthesized precursor ICS-3 and its calcined form. The general formulae for these are:

As-synthesized: $(0.001-0.5)M_{2/n}.SiO_2.yAl_2O_3.(0.15-2.0)R.zH_2O$

Where, M is the group I or II cation, n is the valency, y is the moles of alumina and R is the organic template, z is the moles of water.

Calcined: $(0.001-0.5)M_{2/n}.SiO_2.yAl_2O_3.zH_2O$.

The dried calcined material is substantially free of water.

The original sodium cations of the as-synthesized material can be replaced in accordance with techniques well known in the art, at least in part, by ion exchange with other cations. Preferred replacing cations include group I, II, III, transition metals, noble metals and rare earth metals.

The as-synthesized material, ICS-3 is found to be layered based on the x-ray pattern. The presence of peaks at lower angles is characteristic of layered materials. In this case, the peak at 2θ=4.439° is distinct and disappears upon calcination.

The calcined material does not have this peak, however, there are two other peaks with very low intensities in the range (2θ=4–5°). This is attributed to the collapse of layers upon calcination and fusing of the sheets.

The structures are also evident from micrographs of the two forms of the zeolite.

FIG. 1 is the transmission electron micrograph (TEM) of the as-synthesized material, magnification=50,000. The TEM shows the uniform lattice fringes without any patterns due to intergrowths or any other disorder.

Figure 2:
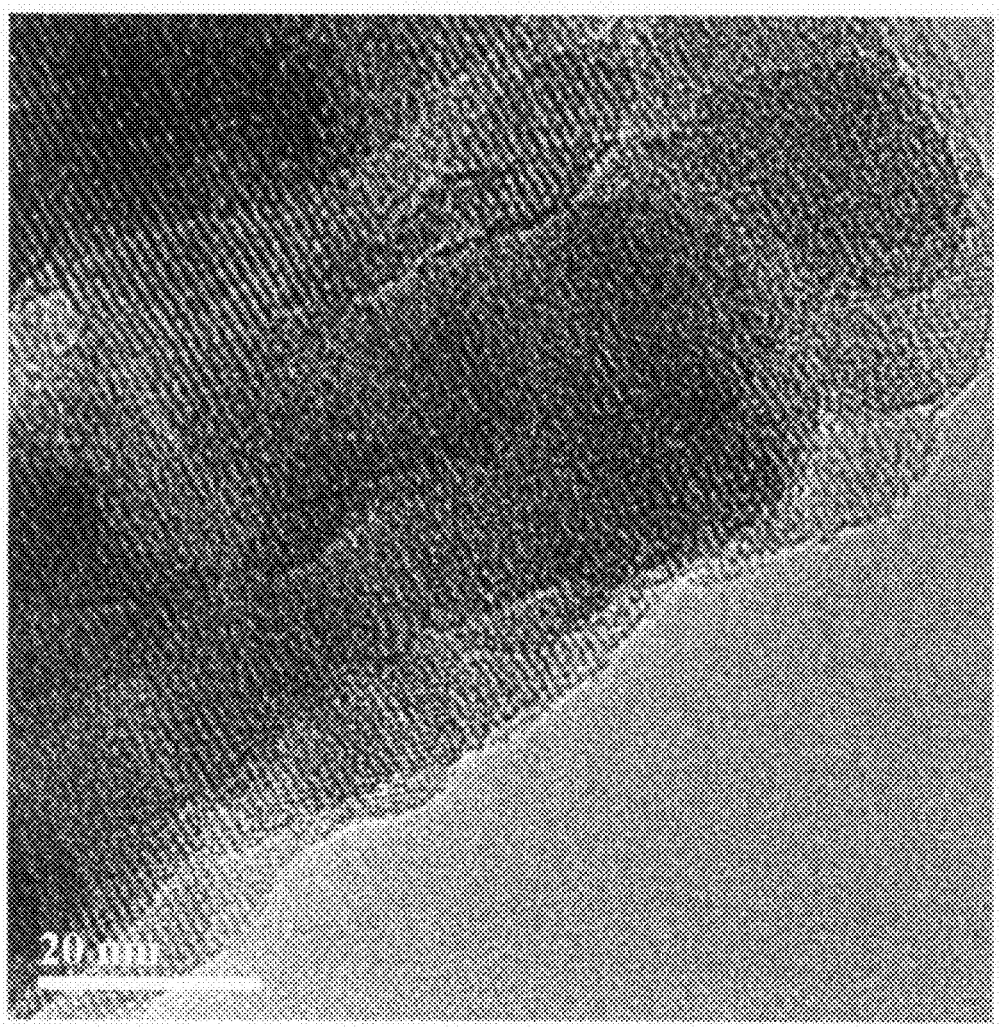
FIG. 2: is a magnified view of that TEM shown in FIG. 1.

FIG. 2 is a more magnified TEM (200,000 times) showing the distinct lattice patterns.

Figure 3:
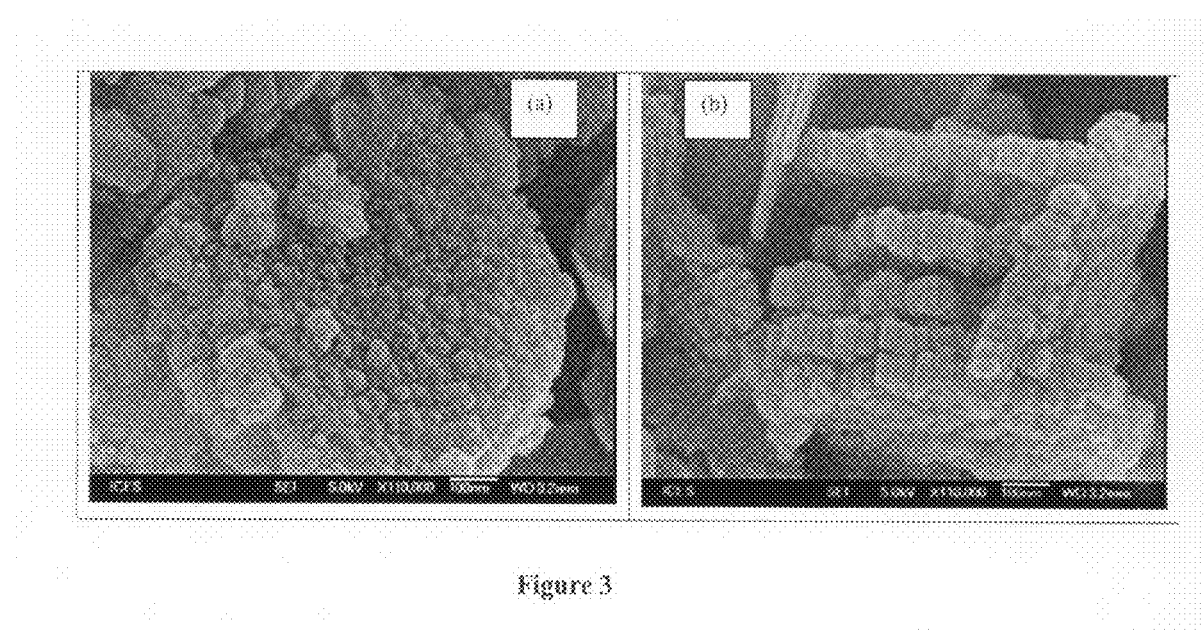
FIG. 3: is a scanning electron micrograph (SEM) of the as-synthesized ICS-3.

FIGS. 3 (a and b) provides scanning electron micrographs (SEM) of the as-synthesized layered precursor. These figures show the zeolite has a large crystal form comprised of numerous nanocomposites. There are flat sheets which are probably nanocomposites fused during crystallization. The layered nature might arise from the inter-sheet distances or the inter-particle distances.

Figure 4:
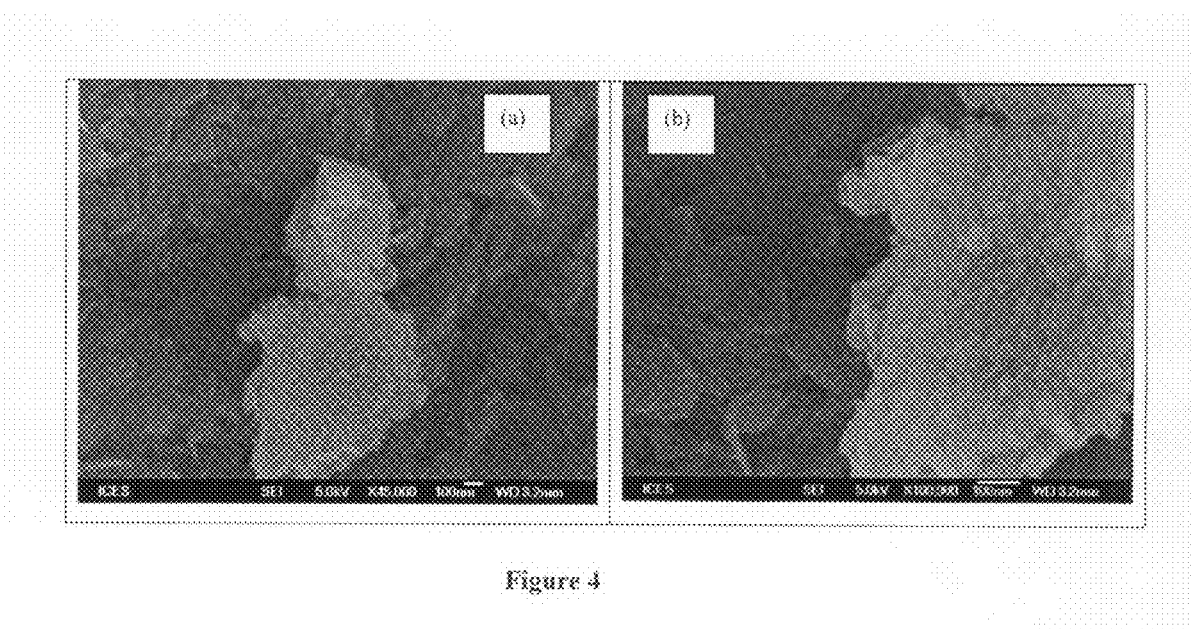
FIG. 4: is a SEM of the calcined ICS-3.

FIGS. 4 (a and b) provides SEMs of the calcined ICS-3 showing that the sheets have fused upon calcination. The layers stack upon each other, having collapsed upon heat treatment.

The surface areas of the ICS-3 (as-synthesized and calcined forms) were ascertained via Brunauer, Emmett, and Teller (BET) analysis and are presented in Table 1.

TABLE 1

| | BET results | | |
| --- | --- | --- | --- |
| | Total Surface area (m²/g) | Micropore Area | Micropore volume |
| ICS-3 (Calcined) | 250-350 | 150-250 | 0.05-0.09 |
| As-synthesized | 30-50 | 0 | 0 |

The total surface area is obtained by fitting the nitrogen adsorption isotherm with the BET equation. The measurement is carried out by adsorbing nitrogen at liquid nitrogen temperature. The t-plot method by Lippens and deBoer yields the external surface area. The difference between the total and the external surface area yields the micropore area. The as-synthesized material does not have any micropores due to the template remaining in the pores and between the layers. However, a little surface is available for the nitrogen adsorption due to broken channels, partially decomposed templates or available pore mouths. Thus, the surface area is substantially only the external surface area in the as-synthesized material.

Upon calcination, the template decomposes completely leading to exposure of the surface. Thus, an increase in the surface area is observed. The particle sizes are from 50-100 nm composites, fused together. Thus, a comparatively very large external surface area is expected, and the layered/thin flakes are shown to possess large external surface area.

Preparation

The preparation of the novel zeolite of the invention is typical with respect to synthesis of other zeolites. The processes involved are the hydrolysis of silicates, addition of templates or the structure directing agents, addition of an aluminium source and/or followed by the addition of a base such as Na, Li or K hydroxides and water.

As Synthesized ICS-3

The ratio of components which can be used in the formation of as-synthesized ICS-3 are as follows:

| Si/Al | from 30-200; preferably 50-80 |
| R/Si | from 0.05-2.0 preferably 0.1-1.0 |
| Na/Si | from 0.1-0.7 preferably 0.3-0.5 |
| $H_2O/Si$ | from 35-60 preferably 40-50. |

There are two important factors in the preparation which give rise to the novel zeolite of the invention:
 a) the use of aluminium nitrate as the aluminium source, and
 b) the amount of template added.

Aluminium Nitrate

We found that use of aluminium nitrate gives rise to ICS-3 whereas the use of aluminium sulphate led to a mixture of different materials, which on occasion yielded ICS-3 (as synthesized).

Template

The identity of the template is important in the preparation of ICS-3. The template is N,N,N,N',N',N'-pentamethylene (bis tetraethylammonium)bromide (Diquat-5).

The amount of template is crucial. The layered structure is favored with higher amounts of templates (R/Si>0.08). Lower amounts (R/Si<0.07) lead to different zeolites namely, ZSM-57 along with or without ZSM-5, mordenite and quartz. 1>R/Si>0.08 leads to the layered material. The preferred amount being R/Si=0.1-1.0.

We also make the following comments concerning other reactants:

Sodium Source

All types of sources of sodium as would be known in the art, such as, sodium hydroxide, halides, salts, and metal complexes are possible. Other potential sources include a combination of hydroxide with or without sodium salts such as, sulfates and halides. The synthesis conditions have to be optimized upon variation in sources. We note that the sodium cation is the preferred cation however the use of other cations such as lithium, potassium or cesium (eg in the forms of LiOH, KOH or CsOH) may be selected without departing from the scope of the invention.

Base

The pH of the process is important. We wish the pH to be kept in the range between 10-13.5.

When the sodium source is NaOH then a base is not required as the pH is substantially in the required range. However when the sodium source can be fully or partly substituted by another species (such as NaCl or $Na_2SO_4$ for example), and the pH is altered. In this case, the pH is maintained by the addition of bases such as ammonia or other quaternary ammonium hydroxides, or amines or alkali/alkaline metal hydroxides partly.

Identity of the Silicon Source

The identity of the silicon source is important. Although a number of silicon sources could be used, as would be known in the art, in the present case, Ludox HS-40 (Aldrich 40 wt. % $SiO_2$ 0.41 wt. % $Na_2O$ and 59.59 wt. % $H_2O$) was by far preferred. HS refers to high sodium content. Ludox HS-40 provides us with the most reproducible results.

We have also conducted a few studies with a variation of silicon sources such as with Ludox LS-40 (Aldrich 40 wt. % $SiO_2$ 0.41 wt. % $Na_2O$ and 59.59 wt. % $H_2O$). Such studies do result in the layered precursor however not always, and the syntheses are not reproducible with these sources.

However, other silicon sources may include alkoxides, fumed silica, colloidal/precipitated silica.

Figure 5:
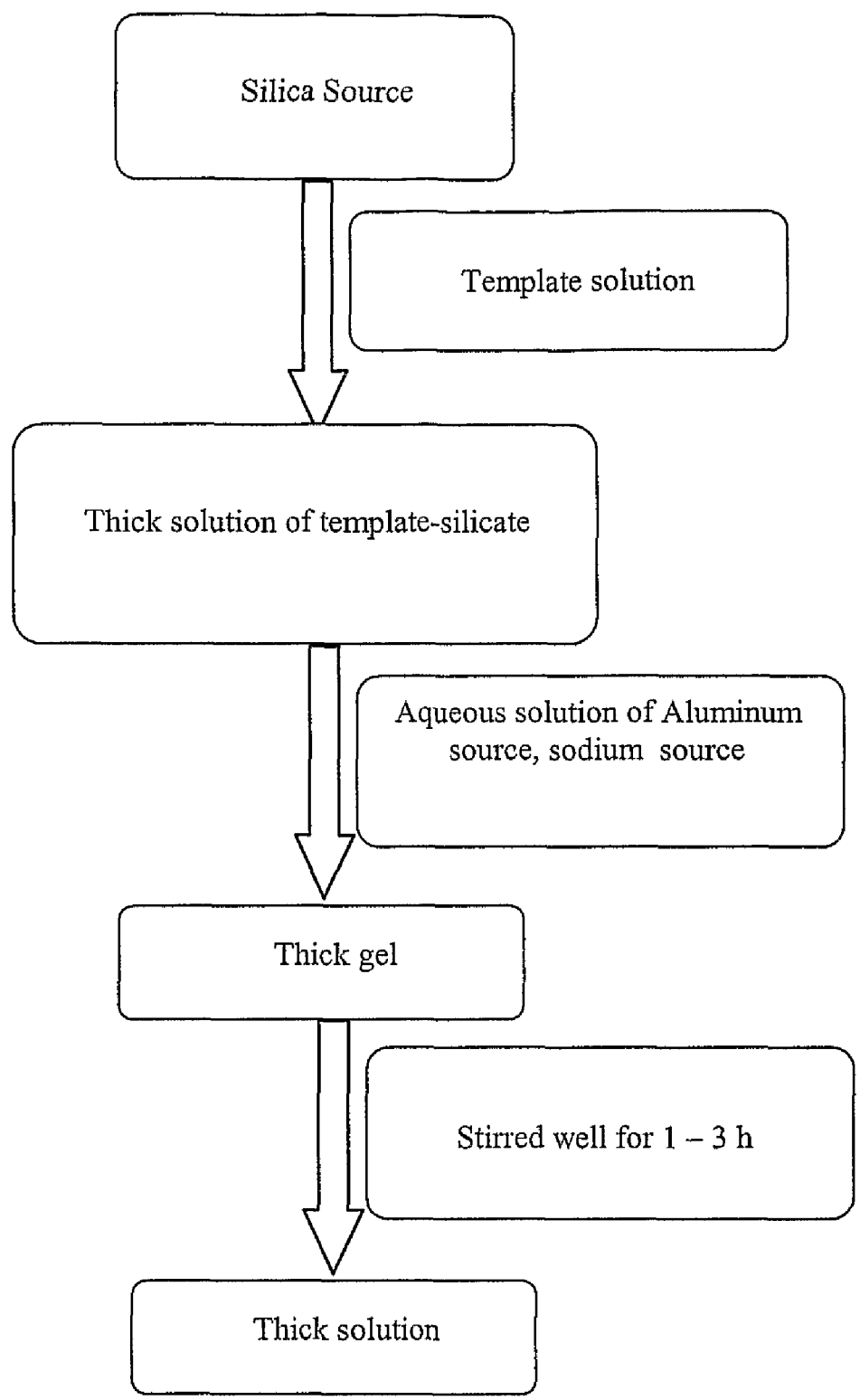
FIG. 5: illustrates a schematic flow diagram of method of the invention.

FIG. 5 illustrates a schematic flow diagram of the process of as synthesized ICS-3 production. An aqueous solution of the Diquat-5 Template is added to the silicon source resulting in a thick template-silicate solution. To this, an aqueous solution including the aluminium and sodium sources is added and the resulting thick gel stirred for 1-3 hours. The final gel was autoclaved at 160° C. under stirring (~250 rpm) for 7-10 days, preferably 7-8 days. The final slurry obtained after the mentioned period was filtered, washed thoroughly with deionized water and dried at 110° C. for 6-12 hours (preferably 6 h). The dried material is the layered as-synthesized ICS-3.

Calcined ICS-3

The as-synthesized ICS-3 is converted to the calcined form by heating. As synthesized ICS-3 is heated generally to a temperature in the range 350° C.-600° C. for a period of 2-20 h, preferably 8-10 hours. The preferred temperature is 550° C. for a preferred period of 8 h.

XRD of the Novel Zeolite of the Invention

Figure 6:
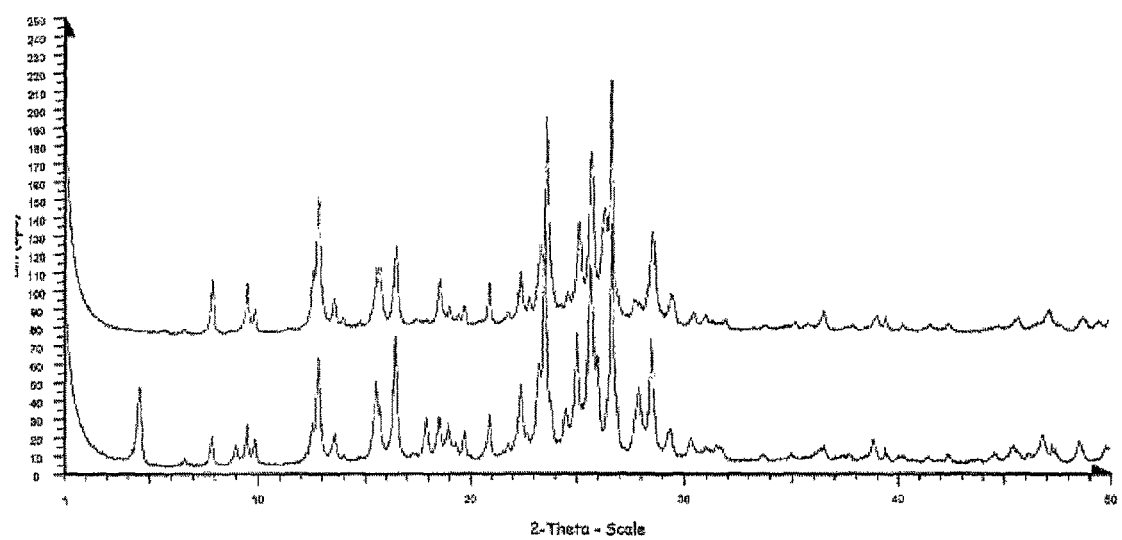
FIG. 6: shows XRD spectra of the as-synthesized and calcined ICS-3.

FIG. 6 provides XRD spectra of the as-synthesized and calcined ICS-3.

As Synthesized ICS-3

Table 2 provides details of the important identifying XRD peaks, Table 3 provides an intermediate list, whilst Table 4 provides a full description. As mentioned previously the as synthesized XRD pattern has the first peak at 2θ~4.439°, d spacing >19.5 Å (the first reflection) followed by the presence of other reflections partly common to ZSM-57 and additional reflections extending from 5 to 50, with five sharp peaks at 2θ of 16.378±0.050, 23.516±0.050, 25.017±0.05, and 26.654±0.050 and 28.488±0.05.

TABLE 2

XRD - characteristic peaks of "as synthesized" layered precursor.

| Angle | d value | Intensity % |
|---|---|---|
| 4.439° | 19.88956 | 29.5 |
| 6.537° | 13.50972 | 5.0 |
| 8.915° | 9.91119 | 9.4 |
| 12.746° | 6.93954 | 40.1 |
| 13.524° | 6.54189 | 13.6 |
| 17.865° | 4.96089 | 19.0 |

TABLE 2-continued

XRD - characteristic peaks of "as synthesized" layered precursor.

| Angle | d value | Intensity % |
|---|---|---|
| 19.694° | 4.50426 | 14.4 |
| 23.516° | 3.78004 | 100.0 |
| 23.820° | 3.73253 | 22.9 |
| 26.654° | 3.34179 | 87.9 |
| 27.897° | 3.19558 | 29.5 |

TABLE 3

XRD - characteristic peaks of "as synthesized" layered precursor-intermediate list

| Angle | d value | Intensity % |
|---|---|---|
| 4.439° | 19.88956 | 29.5 |
| 6.537° | 13.50972 | 5.0 |
| 8.915° | 9.91119 | 9.4 |
| 12.746° | 6.93954 | 40.1 |
| 13.524° | 6.54189 | 13.6 |
| 15.450° | 5.73059 | 32.2 |
| 15.640° | 5.66141 | 23.6 |
| 16.378° | 5.40779 | 47.6 |
| 17.865° | 4.96089 | 19.0 |
| 19.694° | 4.50426 | 14.4 |
| 23.516° | 3.78004 | 100.0 |
| 23.820° | 3.73253 | 22.9 |
| 25.017° | 3.55655 | 49.3 |
| 25.651° | 3.47004 | 72.9 |
| 25.958° | 3.42971 | 41.7 |
| 26.654° | 3.34179 | 87.9 |
| 27.897° | 3.19558 | 29.5 |
| 28.488° | 3.13062 | 46.7 |

TABLE 4

XRD - "As-synthesized" layered precursor.

| Angle | d value | Intensity % |
|---|---|---|
| 4.439° | 19.88956 | 29.5 |
| 6.537° | 13.50972 | 5.0 |
| 7.786° | 11.34538 | 12.4 |
| 8.915° | 9.91119 | 9.4 |
| 9.416° | 9.38484 | 16.6 |
| 9.785° | 9.03194 | 11.8 |
| 12.470° | 7.09257 | 17.4 |
| 12.746° | 6.93954 | 40.1 |
| 13.524° | 6.54189 | 13.6 |
| 13.932° | 6.35152 | 6.3 |
| 14.738° | 6.00579 | 5.4 |
| 15.450° | 5.73059 | 32.2 |
| 15.640° | 5.66141 | 23.6 |
| 16.378° | 5.40779 | 47.6 |
| 17.278° | 5.12811 | 7.0 |
| 17.865° | 4.96089 | 19.0 |
| 18.473° | 4.79920 | 19.4 |
| 18.898° | 4.69209 | 17.2 |
| 19.262° | 4.60421 | 10.4 |
| 19.694° | 4.50426 | 14.4 |
| 20.870° | 4.25288 | 20.2 |
| 21.768° | 4.07953 | 10.3 |
| 22.363° | 3.97223 | 30.8 |
| 22.640° | 3.92433 | 14.6 |
| 23.226° | 3.82662 | 38.3 |
| 23.516° | 3.78004 | 100.0 |
| 23.820° | 3.73253 | 22.9 |
| 24.485° | 3.63260 | 21.6 |
| 25.017° | 3.55655 | 49.3 |
| 25.651° | 3.47004 | 72.9 |
| 25.958° | 3.42971 | 41.7 |
| 26.654° | 3.34179 | 87.9 |
| 27.897° | 3.19558 | 29.5 |
| 28.488° | 3.13062 | 46.7 |
| 29.343° | 3.04132 | 15.9 |
| 30.326° | 2.94497 | 12.3 |
| 31.036° | 2.87921 | 9.2 |
| 31.544° | 2.83398 | 9.7 |
| 31.704° | 2.82003 | 9.6 |
| 33.704° | 2.65713 | 6.4 |
| 35.015° | 2.56058 | 7.0 |
| 36.387° | 2.46712 | 8.6 |
| 36.547° | 2.45670 | 9.6 |
| 37.724° | 2.38271 | 6.5 |
| 38.310° | 2.34758 | 5.5 |
| 38.875° | 2.31474 | 12.0 |
| 39.474° | 2.28097 | 8.2 |
| 40.256° | 2.23848 | 5.8 |
| 41.466° | 2.17590 | 5.2 |
| 42.440° | 2.12821 | 6.7 |
| 43.610° | 2.07377 | 4.4 |
| 43.660° | 2.07151 | 4.4 |
| 43.870° | 2.06210 | 4.9 |
| 44.649° | 2.02791 | 6.7 |
| 45.513° | 1.99138 | 9.3 |
| 46.266° | 1.96072 | 6.7 |
| 46.911° | 1.93524 | 13.5 |
| 47.354° | 1.91818 | 9.7 |
| 47.520° | 1.91186 | 6.9 |
| 48.655° | 1.86989 | 10.5 |

Calcined ICS-3

Table 5 provides details of the important identifying XRD peaks, Table 6 provides an intermediate list, whilst Table 7 provides a full description. The XRD of the calcined form exhibits two peaks with weak intensities higher angle peaks that are common to ZSM-57 and additional peaks that are characteristics of the new phase arising out of the layered precursor. The first peak at 2θ~4.459° is absent in the calcined phase.

TABLE 5

XRD - characteristic peaks of "calcined ICS-3".

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |

TABLE 6

XRD - characteristic peaks of "calcined ICS-3" - intermediate list

| Angle | d value | Intensity % |
|---|---|---|
| 5.590° | 15.79714 | 4.4 |
| 7.792° | 11.33736 | 22.4 |
| 9.421° | 9.38046 | 21.8 |
| 12.510° | 7.06998 | 27.0 |
| 12.745° | 6.94015 | 55.1 |
| 15.660° | 5.65428 | 28.6 |

TABLE 6-continued

XRD - characteristic peaks of "calcined ICS-3" - intermediate list

| Angle | d value | Intensity % |
|---|---|---|
| 16.404° | 5.39941 | 35.6 |
| 18.514° | 4.78863 | 23.5 |
| 23.294° | 3.81561 | 37.3 |
| 23.605° | 3.76605 | 85.7 |
| 24.593° | 3.61693 | 18.8 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |
| 29.434° | 3.03218 | 18.2 |
| 30.451° | 2.93318 | 11.4 |

TABLE 7

XRD - Calcined ICS-3 - full list.

| Angle | 'd' | Intensity % |
|---|---|---|
| 5.590° | 15.79714 | 4.4 |
| 6.508° | 13.57148 | 4.7 |
| 7.792° | 11.33736 | 22.4 |
| 9.421° | 9.38046 | 21.8 |
| 9.759° | 9.05548 | 12.0 |
| 11.358° | 7.78444 | 5.2 |
| 12.510° | 7.06998 | 27.0 |
| 12.745° | 6.94015 | 55.1 |
| 13.491° | 6.55794 | 16.3 |
| 13.890° | 6.37054 | 8.9 |
| 14.666° | 6.03512 | 7.8 |
| 15.660° | 5.65428 | 28.6 |
| 16.404° | 5.39941 | 35.6 |
| 17.381° | 5.09805 | 8.5 |
| 17.862° | 4.96188 | 8.3 |
| 18.514° | 4.78863 | 23.5 |
| 18.935° | 4.68303 | 13.5 |
| 19.358° | 4.58157 | 10.2 |
| 19.678° | 4.50778 | 13.3 |
| 20.842° | 4.25856 | 22.6 |
| 21.725° | 4.08752 | 11.1 |
| 22.357° | 3.97335 | 26.0 |
| 22.754° | 3.90485 | 16.0 |
| 23.294° | 3.81561 | 37.3 |
| 23.605° | 3.76605 | 85.7 |
| 24.593° | 3.61693 | 18.8 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |
| 29.434° | 3.03218 | 18.2 |
| 30.451° | 2.93318 | 11.4 |
| 30.997° | 2.88274 | 10.1 |
| 31.916° | 2.80175 | 8.8 |
| 33.824° | 2.64800 | 6.2 |
| 35.191° | 2.54817 | 7.1 |
| 35.791° | 2.50681 | 7.3 |
| 36.527° | 2.45801 | 11.3 |
| 37.882° | 2.37313 | 6.3 |
| 39.022° | 2.30639 | 10.0 |
| 39.454° | 2.28212 | 9.2 |
| 40.286° | 2.23690 | 5.9 |
| 41.570° | 2.17069 | 6.6 |
| 42.432° | 2.12858 | 7.1 |
| 45.741° | 1.98200 | 9.3 |
| 46.656° | 1.94524 | 7.1 |
| 46.720° | 1.94271 | 6.9 |
| 47.198° | 1.92415 | 11.9 |
| 47.620° | 1.90808 | 6.9 |

TABLE 7-continued

XRD - Calcined ICS-3 - full list.

| Angle | 'd' | Intensity % |
|---|---|---|
| 48.822° | 1.86386 | 9.2 |
| 49.540° | 1.83852 | 7.8 |

Table 8 compares XRD spectra for ZSM-57 and as synthesized. It can be seen that there are common XRD lines with similar intensities in some cases. However the peaks have different intensities in addition to the peak observed at the lower angle for ICS-3.

TABLE 8

Comparison of ZSM-57 and ICS-3.

| ZSM-57 | | | ICS-3 | | |
|---|---|---|---|---|---|
| 2-Theta | d(Å) | Intensity | 2-Theta | d(Å) | Intensity |
| 7.77 | 11.37 | 19.3 | 7.786 | 11.34538 | 12.4 |
| 9.39 | 9.41 | 29.6 | 9.785 | 9.03194 | 11.8 |
| 12.44 | 7.11 | 16.2 | 12.47 | 7.09257 | 17.4 |
| 12.69 | 6.97 | 25.2 | 12.746 | 6.93954 | 40.1 |
| 15.43 | 5.74 | 28.4 | 15.45 | 5.73059 | 32.2 |
| 15.56 | 5.69 | 16.5 | 15.64 | 5.66141 | 23.6 |
| 16.32 | 5.42 | 38.2 | 16.378 | 5.40779 | 47.6 |
| 18.84 | 4.7 | 9.5 | 18.898 | 4.69209 | 17.2 |
| 23.22 | 3.83 | 39.5 | 23.226 | 3.82662 | 38.3 |
| 23.49 | 3.78 | 100 | 23.516 | 3.78004 | 100 |
| 23.75 | 3.74 | 12.9 | 23.82 | 3.73253 | 22.9 |
| 24.45 | 3.64 | 13.1 | 24.485 | 3.6326 | 21.6 |
| 25 | 3.56 | 48.1 | 25.017 | 3.55655 | 49.3 |
| 25.6 | 3.48 | 56.2 | 25.651 | 3.47004 | 72.9 |
| 26.53 | 3.36 | 7.9 | 26.654 | 3.34179 | 41.7 |
| 28.46 | 3.13 | 34.2 | 28.488 | 3.13062 | 46.7 |
| 29.36 | 3.04 | 10.1 | 29.343 | 3.04132 | 15.9 |
| 30.3 | 2.95 | 5.1 | 30.326 | 2.94497 | 12.3 |
| 31.77 | 2.81 | 1 | 31.704 | 2.82003 | 9.6 |
| 33.61 | 2.66 | 2.8 | 33.704 | 2.65713 | 6.4 |

EXAMPLES

The following examples are provided to more fully illustrate the invention.

Example 1

Ludox HS-40: 20.8 g
H$_2$O: 56 g
Diquat-5: 5.9 g
H$_2$O: 17 g
Aluminum nitrate 9.H$_2$O: 1.5 g
Sodium hydroxide: 2.3 g
H$_2$O: 15 g Ludox HS-40 (an aqueous colloidal silica sol solution, (40 wt % silica in water,)) was mixed with distilled water and stirred for 10 min. Diquat-5 was dissolved completely in distilled water. This solution was added to the ludox solution dropwise under vigorous stirring and the mixture was stirred vigorously for 30 min. A clear solution containing aluminium nitrate nonahydrate, sodium hydroxide and water was prepared and added slowly and continuously to the ludox-template mixture under stirring. The thick gel was allowed to homogenize under vigorous stirring at 25° C. for 1 h. The final gel was transferred to a 300 ml SS parr autoclave and allowed to crystallize at 160° C. for 7-12 days and stirred at 250 rpm. The samples were removed periodically and tested for their crystallinity. Completely crystalline materials were obtained after 7 days. The slurry was cooled, filtered and washed well with distilled water and dried at 80° C.-110° C. for 1-2 h. The dried material is the "as-synthesized" layered precursor. The molar gel ratio is:

|  | Si/Al | $H_2O$/Si | R/Si | Na/Si |
|---|---|---|---|---|
| As-synth. ICS-3 | 35 | 40 | 0.1 | 0.5 |

A portion of the as-synthesized material was calcined in a static air furnace at 550° C. for 8 h. The calcined material is ICS-3.

Example 2

Example 2: A synthesis recipe with exactly identical amounts were mixed except for 11.9 g of diquat-5. The amount of the template was doubled. This results in the increase of R/Si=0.2. The final material was found to have a similar pattern mentioned in table 1.

Example 3

13.7 g of Ludox HS40, 36.4 g water, 3.9 g diquat-5 in 7.3 g water were used instead of the previous recipe along with 1.5 g of aluminium nitrate nonahydrate, 2.4 g sodium hydroxide in 14.3 g water.

The molar composition was

|  | Si/Al | $H_2O$/Si | R/Si | Na/Si |
|---|---|---|---|---|
| As-synth. ICS-3 | 47 | 40 | 0.1 | 0.4 |

Figure 7:
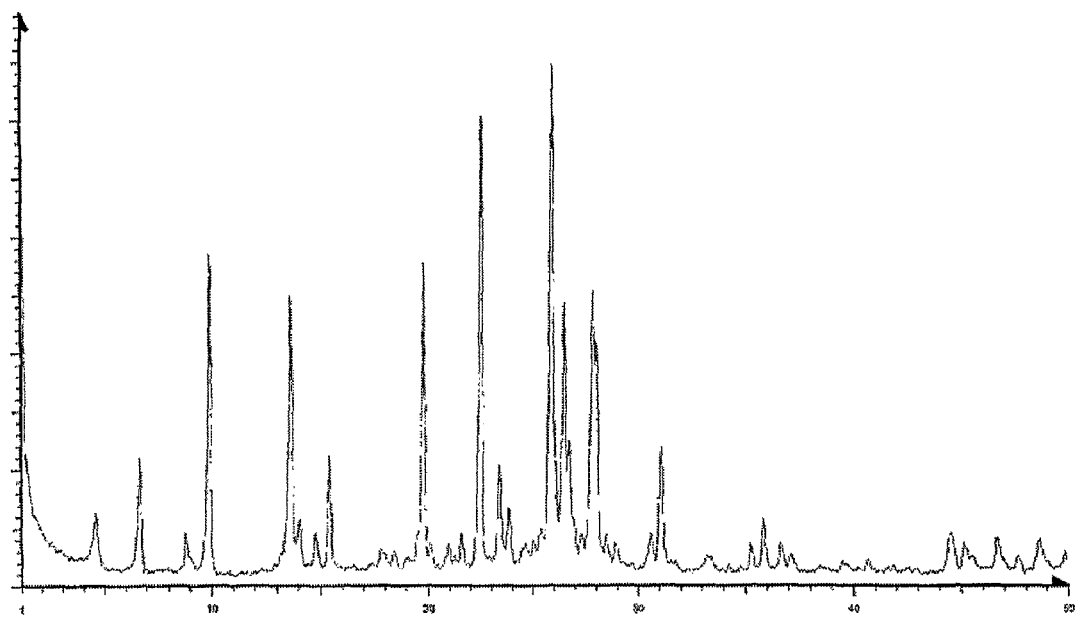
FIG. 7: shows XRD spectra of the product of Example 3.

75% pure layered material was obtained. Another phase was present along with the layered phase. The x-ray pattern is given in FIG. 7.

Potential Applications:

We see the following potential applications for ICS-3:

a) Oligomerization of light olefins: Oligomerization of olefins is a process to convert light olefins to more value added products. This is conventionally carried out over acid catalysts such as ZSM-5. The selectivity towards different fractions is mainly dependent on the size of the pore/channels. The products form important raw materials. The pore structure plays an important role. Thus, we believe ICS-3 being a layered structure is suitable for the formation of the desired fractions.

b) Octane improvement: Isomerization of n-alkanes with 5-8 carbon numbers results in the improvement of octane numbers in the gasoline fraction eliminating aromatics or any other additives such as MTBE. Thus, isomerization of these linear paraffins to branched isomers results in the enhancement of octane numbers. The layered structure, despite fusing of sheets might favor the formation of the highly branched fractions.

c) Alkylation of aromatics: Alkylation of benzene to cumene is one of the important process, likewise, the alkylation of toluene with methanol leads to p-xylene over the shape-selective zeolites. The product is an important raw material.

d) Methanol to olefins/gasoline is a process to convert methanol to olefins or gasolines. Thus, the pore topology and the acidity play a very important role in the product formation.

e) Isomerization and cracking of linear paraffins lead to fractions that enchance the octane numbers.

The above mentioned processes require acid catalysts for effective conversion. ICS-3 owing to its layered structure and acidity due to the aluminum present in the framework is expected to function as the acid catalyst similar to other zeolites. Since, it is believed to be structurally related to the zeolite ZSM-57, it is expected to have properties similar to that of zeolite ZSM-57.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. An oxide material of formula:

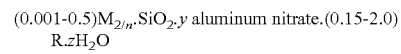

R.$z$H$_2$O wherein M is a group I or II cation,
$n$ is the valency of M,
$v$ is moles of aluminum nitrate,
R is Diquat-5, and
$z$ is moles of water.

2. An oxide material as claimed in claim 1 having an X-ray diffraction pattern comprising lines as set out in the Table below:

| Angle | d value | Intensity % |
|---|---|---|
| 4.439° | 19.88956 | 29.5 |
| 6.537° | 13.50972 | 5.0 |
| 8.915° | 9.91119 | 9.4 |
| 12.746° | 6.93954 | 40.1 |
| 13.524° | 6.54189 | 13.6 |
| 17.865° | 4.96089 | 19.0 |
| 19.694° | 4.50426 | 14.4 |
| 23.516° | 3.78004 | 100.0 |
| 23.820° | 3.73253 | 22.9 |
| 26.654° | 3.34179 | 87.9 |
| 27.897° | 3.19558 | 29.5 |

3. An oxide material as claimed in claim 1 having an X-ray diffraction pattern comprising lines as set out in the Table below:

| Angle | d value | Intensity % |
|---|---|---|
| 4.439° | 19.88956 | 29.5 |
| 6.537° | 13.50972 | 5.0 |
| 8.915° | 9.91119 | 9.4 |
| 12.746° | 6.93954 | 40.1 |
| 13.524° | 6.54189 | 13.6 |
| 15.450° | 5.73059 | 32.2 |
| 15.640° | 5.66141 | 23.6 |
| 16.378° | 5.40779 | 47.6 |
| 17.865° | 4.96089 | 19.0 |
| 19.694° | 4.50426 | 14.4 |

| Angle | d value | Intensity % |
|---|---|---|
| 23.516° | 3.78004 | 100.0 |
| 23.820° | 3.73253 | 22.9 |
| 25.017° | 3.55655 | 49.3 |
| 25.651° | 3.47004 | 72.9 |
| 25.958° | 3.42971 | 41.7 |
| 26.654° | 3.34179 | 87.9 |
| 27.897° | 3.19558 | 29.5 |
| 28.488° | 3.13062 | 46.7 |

4. An oxide material as claimed in claim 1 having an X-ray diffraction pattern comprising lines as set out in the Table below:

| Angle | d value | Intensity % |
|---|---|---|
| 4.439° | 19.88956 | 29.5 |
| 6.537° | 13.50972 | 5.0 |
| 7.786° | 11.34538 | 12.4 |
| 8.915° | 9.91119 | 9.4 |
| 9.416° | 9.38484 | 16.6 |
| 9.785° | 9.03194 | 11.8 |
| 12.470° | 7.09257 | 17.4 |
| 12.746° | 6.93954 | 40.1 |
| 13.524° | 6.54189 | 13.6 |
| 13.932° | 6.35152 | 6.3 |
| 14.738° | 6.00579 | 5.4 |
| 15.450° | 5.73059 | 32.2 |
| 15.640° | 5.66141 | 23.6 |
| 16.378° | 5.40779 | 47.6 |
| 17.278° | 5.12811 | 7.0 |
| 17.865° | 4.96089 | 19.0 |
| 18.473° | 4.79920 | 19.4 |
| 18.898° | 4.69209 | 17.2 |
| 19.262° | 4.60421 | 10.4 |
| 19.694° | 4.50426 | 14.4 |
| 20.870° | 4.25288 | 20.2 |
| 21.768° | 4.07953 | 10.3 |
| 22.363° | 3.97223 | 30.8 |
| 22.640° | 3.92433 | 14.6 |
| 23.226° | 3.82662 | 38.3 |
| 23.516° | 3.78004 | 100.0 |
| 23.820° | 3.73253 | 22.9 |
| 24.485° | 3.63260 | 21.6 |
| 25.017° | 3.55655 | 49.3 |
| 25.651° | 3.47004 | 72.9 |
| 25.958° | 3.42971 | 41.7 |
| 26.654° | 3.34179 | 87.9 |
| 27.897° | 3.19558 | 29.5 |
| 28.488° | 3.13062 | 46.7 |
| 29.343° | 3.04132 | 15.9 |
| 30.326° | 2.94497 | 12.3 |
| 31.036° | 2.87921 | 9.2 |
| 31.544° | 2.83398 | 9.7 |
| 31.704° | 2.82003 | 9.6 |
| 33.704° | 2.65713 | 6.4 |
| 35.015° | 2.56058 | 7.0 |
| 36.387° | 2.46712 | 8.6 |
| 36.547° | 2.45670 | 9.6 |
| 37.724° | 2.38271 | 6.5 |
| 38.310° | 2.34758 | 5.5 |
| 38.875° | 2.31474 | 12.0 |
| 39.474° | 2.28097 | 8.2 |
| 40.256° | 2.23848 | 5.8 |
| 41.466° | 2.17590 | 5.2 |
| 42.440° | 2.12821 | 6.7 |
| 43.610° | 2.07377 | 4.4 |
| 43.660° | 2.07151 | 4.4 |
| 43.870° | 2.06210 | 4.9 |
| 44.649° | 2.02791 | 6.7 |
| 45.513° | 1.99138 | 9.3 |
| 46.266° | 1.96072 | 6.7 |
| 46.911° | 1.93524 | 13.5 |
| 47.354° | 1.91818 | 9.7 |
| 47.520° | 1.91186 | 6.9 |
| 48.655° | 1.86989 | 10.5 |

5. A method of preparing an oxide material having an X-ray diffraction pattern comprising lines as set out in the Table below:

| Angle | d value | Intensity % |
|---|---|---|
| 4.439° | 19.88956 | 29.5 |
| 6.537° | 13.50972 | 5.0 |
| 8.915° | 9.91119 | 9.4 |
| 12.746° | 6.93954 | 40.1 |
| 13.524° | 6.54189 | 13.6 |
| 17.865° | 4.96089 | 19.0 |
| 19.694° | 4.50426 | 14.4 |
| 23.516° | 3.78004 | 100.0 |
| 23.820° | 3.73253 | 22.9 |
| 26.654° | 3.34179 | 87.9 |
| 27.897° | 3.19558 | 29.5 | and having a general formula $(0.001\text{-}0.5)M_{2/n}.SiO_2.y$ aluminum nitrate $.zH_2O$ wherein M is a group I or II cation, n is the valency of M, y is moles of aluminum nitrate, R is Diquat 5, and z is moles of water comprising the steps of:
(a) preparing a reaction mixture of a silica source, a template source, and a sodium source, having mole ratios in the range:
Si/Al from 30-200;
R/Si from 0.05-2.0
Na/Si from 0.1-0.7
$H_2O$/Si from 35-60;
(b) maintaining the reaction mixture under conditions sufficient to allow formation of the oxide material, and
(c) recovering the oxide material from the reaction mixture.

6. A method as claimed in claim 5 wherein in preparing the reaction mixture the mole ratios are in the range:
Si/Al from 50-80
R/Si from 0.1-1.0
Na/Si from 0.3-0.5
$H_2O$/Si from 40-50.

7. A method as claimed in claim 6 comprising the further step of:
d) heating to convert the oxide material to a calcined form having an X-ray diffraction pattern comprising lines as set out in the Table below:

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |

-continued

| Angle | d value | Intensity % |
|---|---|---|
| 27.728° | 3.21470 | 15.7 |
| 27.910° | 3.19415 | 14.9 |
| 28.544° | 3.12468 | 42.0 |

8. A method as claimed in claim 6 wherein the template:silicon ratio is in the range 1>R/Si>0.08.

9. A method as claimed in claim 8 wherein the template:silicon ratio is substantially in the range R/Si=0.1-1.0.

10. A method as claimed in claim 9 comprising the further step of:
d) heating to convert the oxide material to a calcined form having an X-ray diffraction pattern comprising lines as set out in the Table below:

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |

11. A method as claimed in claim 8 comprising the further step of:
d) heating to convert the oxide material to a calcined form having an X-ray diffraction pattern comprising lines as set out in the Table below:

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |

12. A method as claimed in claim 5 wherein the template:silicon ratio is in the range 1>R/Si>0.08.

13. A method as claimed in claim 12 wherein the template:silicon ratio is in the range R/Si=0.1-1.0.

14. A method as claimed in claim 12 comprising the further step of:
d) heating to convert the oxide material to a calcined form having an X-ray diffraction pattern comprising lines as set out in the Table below:

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |

15. A method as claimed in claim 5 comprising the further step of:
d) heating to convert the oxide material to a calcined form having an X-ray diffraction pattern comprising lines as set out in the Table below:

| Angle | d value | Intensity % |
|---|---|---|
| 5.590° | 15.79714 | 4.4 |
| 7.792° | 11.33736 | 22.4 |
| 12.745° | 6.94015 | 55.1 |
| 15.660° | 5.65428 | 28.6 |
| 23.294° | 3.81561 | 37.3 |
| 23.605° | 3.76605 | 85.7 |
| 25.115° | 3.54287 | 46.0 |
| 25.698° | 3.46382 | 72.3 |
| 26.320° | 3.38342 | 50.0 |
| 26.622° | 3.34568 | 100.0 |
| 27.728° | 3.21470 | 15.7 |
| 27.910° | 3.19415 | 14.9 |
| 28.544° | 3.12468 | 42.0 |

16. A method as claimed in claim 15 wherein the calcined form has a formula:

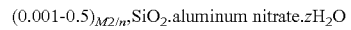

$(0.001\text{-}0.5)_{M2/n}.SiO_2.\text{aluminum nitrate}.zH_2O$ wherein M is a group I or II cation, n is the valency of M, y is moles of aluminum nitrate, R is Diquat-5, and z is moles of water.

\* \* \* \* \*

UNITED STATES PATENT AND TRADEMARK OFFICE
CERTIFICATE OF CORRECTION

PATENT NO. : 7,976,822 B2
APPLICATION NO. : 11/667922
DATED : July 12, 2011
INVENTOR(S) : Raman Ravishankar and Elango Shanmugam Page 1 of 1

It is certified that error appears in the above-identified patent and that said Letters Patent is hereby corrected as shown below:

Column 6, line 53, "20" should be --2θ--

Column 6, line 54, "16.378 ± 0.050" should be --16.378±0.05°--

Column 6, line 54, "23.516±0.050" should be --23.516±0.05°--

Column 6, line 55, "26.654±0.050" should be --26.654±0.05°--

Column 15, line 11, claim 9, the word "substantially" should be deleted.

Signed and Sealed this
Third Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,976,822 B2 | Page 1 of 1 |
| APPLICATION NO. | : 11/667922 | |
| DATED | : July 12, 2011 | |
| INVENTOR(S) | : Ravishankar et al. | |

It is certified that error appears in the above-identified patent and that said Letters Patent is hereby corrected as shown below:

On the title page item (56), under U.S. Patent Documents line 6, - References Cited - 7,264,789 B1 9/2007 Verdujin et al should be --Verduijn et al.--

Signed and Sealed this
Fourteenth Day of February, 2012

David J. Kappos
*Director of the United States Patent and Trademark Office*